(12) United States Patent
Ramalingam et al.

(10) Patent No.: US 9,200,159 B2
(45) Date of Patent: Dec. 1, 2015

(54) BLENDS OF POLYETHERSULFONES AND POLYPHENYLENE SULFIDE RESINS

(71) Applicant: SABIC INNOVATIVE PLASTICSIP B.V., Bergen op Zoom (NE)

(72) Inventors: Hariharan Ramalingam, Bangalore (IN); Kapil Sheth, Evansville, IN (US)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 177 days.

(21) Appl. No.: 13/791,714

(22) Filed: Mar. 8, 2013

(65) Prior Publication Data

US 2014/0194579 A1  Jul. 10, 2014

Related U.S. Application Data

(60) Provisional application No. 61/749,194, filed on Jan. 4, 2013.

(51) Int. Cl.

| | | |
|---|---|---|
| C08L 81/04 | (2006.01) | |
| C08L 63/00 | (2006.01) | |
| C08L 81/02 | (2006.01) | |
| C08L 101/00 | (2006.01) | |
| C08J 3/00 | (2006.01) | |
| C09D 181/06 | (2006.01) | |
| C08G 73/10 | (2006.01) | |
| C08L 81/06 | (2006.01) | |
| H01B 3/30 | (2006.01) | |
| H01B 3/40 | (2006.01) | |
| C08L 79/08 | (2006.01) | |

(52) U.S. Cl.
CPC ............. *C08L 81/04* (2013.01); *C08G 73/1046* (2013.01); *C08J 3/005* (2013.01); *C08L 63/00* (2013.01); *C08L 81/02* (2013.01); *C08L 81/06* (2013.01); *C08L 101/00* (2013.01); *C09D 181/06* (2013.01); *H01B 3/306* (2013.01); *H01B 3/307* (2013.01); *H01B 3/40* (2013.01); *C08J 2381/04* (2013.01); *C08J 2381/06* (2013.01); *C08J 2463/04* (2013.01); *C08J 2479/08* (2013.01); *C08L 79/08* (2013.01)

(58) Field of Classification Search
None
See application file for complete search history.

(56) References Cited

U.S. PATENT DOCUMENTS

| | | | |
|---|---|---|---|
| 4,528,346 A * | 7/1985 | Sugie et al. ................. | 525/523 |
| 4,985,293 A | 1/1991 | Keep | |
| 5,093,435 A | 3/1992 | Harris et al. | |
| 5,840,793 A | 11/1998 | Glaser et al. | |
| 6,149,840 A | 11/2000 | Ardakani et al. | |
| 6,612,343 B2 | 9/2003 | Camberlin et al. | |
| 7,173,090 B2 | 2/2007 | Akiyama et al. | |
| 8,221,862 B2 | 7/2012 | Saitoh et al. | |
| 2009/0041968 A1 * | 2/2009 | Saitoh et al. ................. | 428/36.9 |
| 2011/0263791 A1 | 10/2011 | Chiong et al. | |
| 2013/0196104 A1 * | 8/2013 | Matsumoto et al. ....... | 428/36.92 |

FOREIGN PATENT DOCUMENTS

| | | | |
|---|---|---|---|
| CA | 2154070 C | | 8/2004 |
| CN | 101760965 A | | 6/2010 |
| EP | 0382409 A2 | | 8/1990 |
| EP | 0718350 B1 | | 3/2001 |
| GB | 2113235 A | | 8/1983 |
| GB | 2486998 A | | 7/2012 |
| JP | 200654300 | | 2/2006 |
| JP | 2007002221 A | | 1/2007 |
| JP | 2007276456 | | 10/2007 |
| JP | 2008007663 A | | 1/2008 |
| JP | 2008231249 | | 10/2008 |
| JP | 2008280507 | | 11/2008 |
| JP | 2010123389 | | 6/2010 |
| JP | 4919524 B2 | | 2/2012 |
| JP | 4919542 | | 2/2012 |
| KR | 1147340 B1 | | 5/2012 |
| WO | WO 2012-053505 | * | 4/2012 |
| WO | WO2012053505 A1 | | 4/2012 |

OTHER PUBLICATIONS

Chemical Journal of Chinese Universities; vol. 22; No. 8;1414-1418.
Journal of Applied Polymer Science; vol. 85; 1297-1306; (2002); Reactive Reinforcement of the Interface of Poly (Ether Sulfone)/Poly(Phenylene Sulfide) Polymer Blend by PMR-PO.
Journal of Applied Polymer Science; vol. 74, 1686-1692(1999)Shibata et al; Crystallization and Melting Behavior of Poly(P-Phenylene Sulfide) in Blends With Poly(Ether Sulfone).
Journal of Applied Polymer Science; vol. 83, 2906-2914 (2002) Thermally Crosslinkable Poly(Phenylene Sulfide) /Poly(Ether Sulfone)/Polymerization of Monomer Reactant-Polyimide.

* cited by examiner

*Primary Examiner* — Robert C Boyle

(74) *Attorney, Agent, or Firm* — Novak Druce Connolly Bove + Quigg LLP

(57) ABSTRACT

A composition including a blend of: a) a polyethersulfone; b) a polyphenylene sulfide (PPS); and c) an epoxy, and optionally a polyetherimide, wherein the polyetherimide and epoxy are present in an amount effective to act as a compatibilizer for the polyethersulfone and polyphenylene sulfide (PPS). Methods of compatibilizing a blend of polyethersulfone and polyphenylene sulfide (PPS). The method can include melt mixing a polyethersulfone, and polyetherimide, a polyphenylene sulfide (PPS) and an epoxy under conditions of elevated temperature and simultaneous mixing.

12 Claims, No Drawings

BLENDS OF POLYETHERSULFONES AND POLYPHENYLENE SULFIDE RESINS

CROSS REFERENCE TO RELATED APPLICATIONS

This application is a Non-Provisional of U.S. Application Ser. No. 61/749,194, having been filed on Jan. 4, 2013, herein incorporated by reference in its entirety.

BACKGROUND OF THE INVENTION

There has long been interest in developing thermoplastic amorphous—semi crystalline blends that exhibit good mechanicals retention at high temperature and resistance to chemicals. Many polymer blends exhibiting crystalline properties are known in the art. However, these polymers generally tend to be incompatible with other polymers. When a compatible blend of a Polyethersulfone and another polymer is desired, it is often necessary to add a small amount of another ingredient or compatibilizer to promote more thorough blending between the two polymers. The additional ingredient may work by promoting bond formation between diverse polymer molecules. However, a compatibilizer that is effective in one system may not be effective in others; a great deal depends upon the specific functionalities of the molecules.

An important driving force in seeking new polymer blend is cost effectiveness. It is often desirable, for example, to discover new blends that have one or more desirable characteristics found in an expensive polymer, but cost less. This is usually accomplished by finding a suitable blend comprising the expensive polymer and a less expensive one.

Another reason for blending polymers is to create compositions that are better able to meet special needs than the polymer known in the art. Accordingly, it is sometimes desired to combine a Polyethersulfone with another polymer having special characteristics in the hope of creating a blend exhibiting the desired characteristics of both polymers. For example, polyphenylenesulfides (PPS) has very good thermal stability and chemical resistance, potentially important characteristics for a PPS blend. Polyether sulfones (PSU) exhibits good retention of mechanicals at high temperature. However, Polyether sulfone are generally incompatible with PPS. PES/PPS blends tend to have large regions or domains of the individual polymers rather than fine, well-dispersed domains; the large domains tend to produce poor properties, e.g. parts having poor tensile properties.

BRIEF SUMMARY OF THE INVENTION

Various embodiments relate to preparation of compatible immiscible blends of Polyethersulfone and Polyphenylene sulfides (PPS). The new composition blends with Polyether imide/Epoxy as a compatibilizers shows excellent improvement in the mechanicals, heat and good melt flow characteristics. This phase-separated blend improves high temperature load bearing properties and dimensional stability of PPS and improves flow, chemical resistance, and FR properties of Polyethersulfone.

Various embodiments relate to a process in which a PPS having reactive end groups (such as thiol and chlorine) is compatibilized with Polyether sulfones, or derivatives thereof, using a mixture Polyether imide and epoxies as compatibilizer. In the process according to various embodiments, two polymers to be blended are melt mixed with compatibilizer and extruded.

Various embodiments provide a process for reactive compatibilizing Polyethersulfone with PPS. Crystallization rate of PPS along with other properties such as flow, heat resistance, chemical resistance and cost can be tailored as desired by varying the compositions of following resins such as amount of PPS, Polyethersulfone-, Ultem and Epoxies.

These and other features, aspects, and advantages of the present invention will become better understood with reference to the following description and appended claims.

DETAILED DESCRIPTION OF THE INVENTION

The present invention may be understood more readily by reference to the following detailed description of preferred embodiments of the invention as well as to the examples included therein. All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

A composition comprising a blend of: a) a polyethersulfone; b) a polyphenylene sulfide (PPS); and c) an epoxy, and optionally a polyetherimide, wherein the polyetherimide and epoxy are present in an amount effective to act as a compatibilizer for the polyethersulfone and polyphenylene sulfide (PPS).

The composition can have a tensile strength within a range having a lower limit and/or an upper limit. The range can include or exclude the lower limit and/or the upper limit. The lower limit and/or upper limit can be selected from 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 105, 110, 115, 120, 125, 130, 135, 140, 145, 150, 155, 160, 165, 170, 175, 180, 185, 190, 195, 200, 210, 220, 230, 240, 250, 260, 270, 280, 290, 300, 325, 350, 375, 400, 425, 450, 475, and 500 MPa. For example, according to certain preferred embodiments, the composition can have a tensile strength greater than 75 MPa.

The composition can have an impact strength within a range having a lower limit and/or an upper limit. The range can include or exclude the lower limit and/or the upper limit. The lower limit and/or upper limit can be selected from 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 85, 90, 95, 100, 105, 110, 115, 120, 125, 130, 135, 140, 145, 150, 155, 160, 165, 170, 175, 180, 185, 190, 195, 200, 210, 220, 230, 240, 250, 260, 270, 280, 290, 300, 325, 350, 375, 400, 425, 450, 475, and 500 J/m. For example, according to certain preferred embodiments, the composition can have an impact strength of at least 65 J/m.

The composition can have an elongation at break within a range having a lower limit and/or an upper limit. The range can include or exclude the lower limit and/or the upper limit. The lower limit and/or upper limit can be selected from 90, 91, 92, 93, 94, 95, 96, 97, 98, 99, 100, 101, 102, 103, 104, 105, 106, 107, 108, 109, 110, 11, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, and 500%. For example, according to certain preferred embodiments, the composition can have an elongation at break of at least 116%.

The epoxy can be an epoxy cresol Novolac resin. The polyphenylene sulfide (PPS) can be a linear poly(phenylene) sulfide. The morphology of the composition can be fine, well-dispersed domains of polyethersulfone and polyphenylene sulfide (PPS).

The polyetherimide can be present in an amount within a range having a lower limit and/or an upper limit. The range can include or exclude the lower limit and/or the upper limit. The lower limit and/or upper limit can be selected from 0, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, 42, 42.5, 43, 43.5, 44, 44.5, 45, 45.5, 46, 46.5, 47, 47.5, 48, 48.5, 49, 49.5, and 50 percent by weight based on the total weight of the composition. For example, according to certain preferred embodiments, the polyetherimide can be present in an amount from 0-30 percent by weight based on the total weight of the composition.

The epoxy can be present in an amount within a range having a lower limit and/or an upper limit. The range can include or exclude the lower limit and/or the upper limit. The lower limit and/or upper limit can be selected from 0, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 21, 22, 23, 24, and 25 percent by weight based on the total weight of the composition. For example, according to certain preferred embodiments, The epoxy can be present in an amount of from 0.5-1.5 percent by weight based on the total weight of the composition.

The composition can exhibit a heat deflection temperature (HDT) within a range having a lower limit and/or an upper limit. The range can include or exclude the lower limit and/or the upper limit. The lower limit and/or upper limit can be selected from 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 185, 190, 195, 200, 205, 210, 215, 220, 225, 230, 235, 240, 245, 250, 260, 270, 280, 290, 300, 325, 350, 375, 400, 425, 450, 475, and 500 degrees Celsius. For example, according to certain preferred embodiments, the composition can exhibit a heat deflection temperature (HDT) of at least 165 degrees Celsius.

The polyethersulfone can be present in an amount within a range having a lower limit and/or an upper limit. The range can include or exclude the lower limit and/or the upper limit. The lower limit and/or upper limit can be selected from 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, 42, 42.5, 43, 43.5, 44, 44.5, 45, 45.5, 46, 46.5, 47, 47.5, 48, 48.5, 49, 49.5, 50, 50.5, 51, 51.5, 52, 52.5, 53, 53.5, 54, 54.5, 55, 55.5, 56, 56.5, 57, 57.5, 58, 58.5, 59, 59.5, 60, 60.5, 61, 61.5, 62, 62.5, 63, 63.5, 64, 64.5, 65, 65.5, 66, 66.5, 67, 67.5, 68, 68.5, 69, 69.5, 70, 70.5, 71, 71.5, 72, 72.5, 73, 73.5, 74, 74.5, 75, 75.5, 76, 76.5, 77, 77.5, 78, 78.5, 79, 79.5, 80, 80.5, 81, 81.5, 82, 82.5, 83, 83.5, 84, 84.5, 85, 85.5, 86, 86.5, 87, 87.5, 88, 88.5, 89, 89.5, and 90 percent by weight based on the total weight of the composition. For example, according to certain preferred embodiments, the polyethersulfone can be present in an amount of from 49.5-74.5 percent by weight based on the total weight of the composition.

The polyphenylene sulfide (PPS) can be present in an amount within a range having a lower limit and/or an upper limit. The range can include or exclude the lower limit and/or the upper limit. The lower limit and/or upper limit can be selected from 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, 42, 42.5, 43, 43.5, 44, 44.5, 45, 45.5, 46, 46.5, 47, 47.5, 48, 48.5, 49, 49.5, 50, 50.5, 51, 51.5, 52, 52.5, 53, 53.5, 54, 54.5, 55, 55.5, 56, 56.5, 57, 57.5, 58, 58.5, 59, 59.5, 60, 60.5, 61, 61.5, 62, 62.5, 63, 63.5, 64, 64.5, 65, 65.5, 66, 66.5, 67, 67.5, 68, 68.5, 69, 69.5, 70, 70.5, 71, 71.5, 72, 72.5, 73, 73.5, 74, 74.5, 75, 75.5, 76, 76.5, 77, 77.5, 78, 78.5, 79, 79.5, 80, 80.5, 81, 81.5, 82, 82.5, 83, 83.5, 84, 84.5, 85, 85.5, 86, 86.5, 87, 87.5, 88, 88.5, 89, 89.5, and 90 percent by weight based on the total weight of the composition. For example, according to certain preferred embodiments, the polyphenylene sulfide (PPS) can be present in an amount of 24.5-74.5 percent by weight based on the total weight of the composition.

Various embodiments relate to an extrudate comprising the composition according to various other embodiments. Various embodiments relate to a molded product comprising the composition of various other embodiments.

Various embodiments relate to a method of compatibilizing a blend of polyethersulfone and polyphenylene sulfide (PPS). The method can include melt mixing a polyethersulfone, a polyetherimide, a polyphenylene sulfide (PPS) and an epoxy under conditions of elevated temperature and simultaneous mixing. The simultaneous mixing can be performed in a single pass in a vented extruder. The extruder can be a twin screw extruder. The screws of the extruder can be run at a rotation within a range having a lower limit and/or an upper limit. The range can include or exclude the lower limit and/or the upper limit. The lower limit and/or upper limit can be selected from 150, 155, 160, 165, 170, 175, 180, 185, 190, 195, 200, 205, 210, 215, 220, 225, 230, 235, 240, 241, 242, 243, 244, 245, 246, 247, 248, 249, 250, 251, 252, 253, 254, 255, 256, 257, 258, 259, 260, 265, 270, 275, 280, 285, 290, 295, 300, 305, 310, 315, 320, 325, 330, 335, 340, 345, 350, 355, 360, 365, 370, 375, 380, 385, 390, 395, and 400 rotations per minute (rpm) under vacuum. For example, according to certain preferred embodiments, the screws of the extruder can be run at a rotation of about 250 rotations per minute (rpm) under vacuum.

The method can be performed at an elevated temperature. The elevated temperature can be within a range having a lower limit and/or an upper limit. The range can include or exclude the lower limit and/or the upper limit. The lower limit and/or upper limit can be selected from 200, 205, 210, 215, 220, 225, 230, 235, 240, 245, 250, 255, 260, 265, 270, 275, 280, 285, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 365, 370, 375, 380, 385, 390, 395, 400, 405, 410, 415, 420, 425, 430, 435, 440, 445, 450, 455, 460, 465, 470, 475, 480, 485, 490, 495, and 500 degrees Celsius. For example, according to certain preferred embodiments, The elevated temperature can be in the range of 300 to 350 degrees Celsius.

According to various other embodiments of the method the compatibilized blend of polyethersulfone and polyphenylene sulfide can be extruded. The extruded blend can be cooled, pelletized and dried at a temperature within a range having a lower limit and/or an upper limit. The range can include or exclude the lower limit and/or the upper limit. The lower limit and/or upper limit can be selected from 100, 105, 110, 115, 120, 125, 130, 135, 140, 141, 142, 143, 144, 145, 146, 147, 148, 149, 150, 151, 152, 153, 154, 155, 156, 157, 158, 159, 160, 165, 170, 175, 180, 185, 190, 195, 200, 205, 210, 215, 220, 225, 230, 235, 240, 245, 250, 260, 270, 280, 290, 300, 310, 320, 330, 340, 350, 360, 370, 380, 390, 400, 425, 450, 475, 500, 525, 550, 575, and 600 degrees Celsius. For example, according to certain preferred embodiments, the extruded blend can be cooled, pelletized and dried at a temperature of about 150 degrees Celsius.

The method can further include injection molding a melt from the pellets at a temperature within a range having a lower limit and/or an upper limit. The range can include or exclude the lower limit and/or the upper limit. The lower limit and/or upper limit can be selected from 300, 305, 310, 315, 320, 325, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 365, 370, 375, 380, 385, 390, 395, 400, 405, 410, 415, 420, 425, 430, 435, 440, 445, 450, 475, 500, 525, 550, 575, 600, 625, 650, 675, and 700 degrees Celsius. For example, according to certain preferred embodiments, the method can further include injection molding a melt from the pellets at a temperature of 340-350 degrees Celsius.

The temperature of the injection mold can be within a range having a lower limit and/or an upper limit. The range can include or exclude the lower limit and/or the upper limit. The lower limit and/or upper limit can be selected from 50, 55, 60, 65, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 165, 170, 175, 180, 185, 190, 195, 200, 205, 210, 215, 220, 225, 230, 235, 240, 245, 250, 275, 300, 325, 350, 375, 400, 425, 450, 475, and 500 degrees Celsius. For example, according to certain preferred embodiments, the temperature of the injection mold can be in the range of 80-150 degrees Celsius.

An injection molded product can be formed by the process according to various embodiments.

EXAMPLES

Table 1 describes materials employed in the examples.

TABLE 1

| Material | Description | Source |
|---|---|---|
| Polyethersulfone | Ultrason ® | Sumitomo |
| Polyetherimide | ULTEM ® | SABIC Innovative Plastics |
| Linear poly(phenylene sulfide) | Fortron ® 0214B | Ticona |
| Polymeric compound having an average of 24 pendant epoxy per molecule | Joncryl ® ADR4368 | BASF |
| Epoxy cresol novolac resin (ECN) | Poly(o-cresyl glycidyl ether)-co-formaldehyde | Aldrich |

Techniques & Procedures

Composition Preparation Techniques: Resin compositions were formed by melt mixing the polyethersulfone and poly(phenylene sulfide)s. Blends were prepared by extrusion in a 2.5-inch twin screw, vacuum vented extruder. Compositions are listed in weight percent, based on the total weight of the composition in the tables below. The extruder was set at about 300-350° C. The blends were run at approximately 250 rotations per minute (rpm) under vacuum. Compositions were made in a one pass method (in accordance to the composition preparation procedure described above. The extrudate was cooled, pelletized, and dried at 150° C. Test samples were injection molded at a set temperature of 340-350° C. and mold temperature of 80-150° C. using a 30 second cycle time.

Properties Testing

Properties were measured using ASTM test methods. All molded samples were conditioned for at least 48 hours at 50% relative humidity prior to testing.

ASTM D256: Notched Izod impact values were measured at room temperature on 3.2 millimeter thick bars as per ASTM D256. Bars were notched prior to oven aging; samples were tested at room temperature. Results are in Joules per meter (J/m).

ASTM D638: Tensile properties were measured on 3.2 millimeter type I bars as per ASTM method D638 at 23° C. with a crosshead speed of 5 millimeters/minute. Tensile strength is reported at yield (Y), percent elongation (% Elong.) is reported at break (B). Tensile modulus, tensile strength at yield, tensile strength at break results is reported in MPa.

ASTM 0648: Heat Deflection Temperature (HDT) were measured on 3.2 millimeter injection molded bar at 1.82 MPa Stress. HDT is reported in degree Celsius (C).

The composition of Polyethersulfones and polyphenylene sulfides has been studied heretofore. For example a resin composition formed by mixing which comprises Polyethersulfone and polyphenylene sulfides (a) 1-99 parts by weight of Polyethersulfone resin composition (b) 1-99 parts by weight of. Polyphenylene sulfides (c) 0-25% parts by weight of Polyether imide composition (d) 0.5-1.5% parts by weight of epoxy. The total of (a), (b), (c) & (d) being 100% by weight. Blends were prepared by extrusion in a 2.5-inch twin screw, vacuum vented extruder. Compositions are listed in wt % in Tables.

Results

According to various embodiments, Polyethersulfone and polyphenylene sulfides are immiscible and show excellent compatibility with polyether imide and epoxy. The amount for polyether imide in the blend was limited to less than wt % and epoxy varies from 0.5-1.5%. The blends exhibit excellent processibility with improved tensile and impact performance. The blends show good mechanical, heat and flow performance at certain compositions as mentioned in the Tables below.

Examples 1-8

The purpose of Examples 1-8 was to demonstrate the effect of differing amounts and types of polymeric compatibilizer in compositions having Polyethersulfones and poly(arylene sulfide) resins. Compositions were made in accordance to the composition preparation procedure described above. The compositions were tested as described above and results are shown in Table 2.

TABLE 2

| Polymer | 1* | 2* | 3* | 4* | 5* | 6 | 7* | 8* |
|---|---|---|---|---|---|---|---|---|
| Ultrason | 25 | 24.5 | 24.5 | 20 | 50 | 49.5 | 49.5 | 45 |
| PPS | 75 | 74.5 | 74.5 | 70 | 50 | 49.5 | 49.5 | 45 |
| Ultem | | | | 10 | | | | 10 |
| ECN | | 1 | | | | 1 | | |
| Joncryl | | | 1 | | | | 1 | |
| Tensile strength (MPa) | 86 | 77 | 80 | 67 | 74 | 81 | 79 | 83 |
| Tensile modulus (GPa) | 3.3 | 3.3 | 3.4 | 3.5 | 2835 | 2885 | 3340 | 2900 |
| % Elongation | 4 | 5 | 6 | 4 | 4 | 120 | 116 | 5 |
| Flexural strength (MPa) | 110 | 111 | 121 | 111 | 124 | 124 | 122 | 128 |
| Flexural modulus (GPa) | 2829 | 2719 | 2882 | 2890 | 2609 | 2603 | 2644 | 2687 |
| MFR 337° C., 6.7 Kg, 5 min (g/10 min) | 151 | 64 | 51 | 136 | 86 | 29 | 21 | 82 |
| HDT (@ 1.82 MPa) | 97 | 93 | 93 | 96 | 111 | 131 | 131 | 136 |
| Notched Izod Impact (J/m) | 28 | 43 | 40 | 14 | 31 | 69 | 69 | 32 |

*Comparative Example

These examples demonstrate that only by using a novolac resin in the required amount yields a composition capable of achieving a combination of a tensile strength greater than or equal to 75 MPa, impact strength of greater than or equal to 65 J/m, and an elongation at break greater than or equal to 116%.

Examples 9-12

The purpose of Examples 9-12 was to demonstrate the effect of differing amounts and types of polymeric compatibilizer in compositions having Polyethersulfones rich resin. Compositions were made in accordance with the composition preparation procedure described above. The compositions were tested as described above and results are shown in Table 3.

TABLE 3

| Polymer | 9* | 10 | 11* | 12* |
|---|---|---|---|---|
| Ultrason | 75 | 74.5 | 74.5 | 70 |
| PPS | 25 | 24.5 | 24.5 | 20 |
| Ultem | | | | 10 |
| ECN | | 1 | | |
| Joncryl | | | 1 | |
| Tensile strength (MPa) | 85 | 87 | 88 | 81 |
| Tensile modulus (GPa) | 2611 | 2742 | 2819 | 2832 |
| % Elongation | 62 | 101 | 88 | 7 |
| Flexural strength (MPa) | 124 | 125 | 126 | 126 |
| Flexural modulus (GPa) | 2506 | 2513 | 2518 | 2452 |
| MFR 337° C., 6.7 kg, 5 min (g/10 min) | 28 | 21 | 18 | 14 |
| HDT (1.82 MPa) | 164 | 165 | 165 | 183 |
| Notched Izod Impact J/m | 113 | 142 | 147 | 102 |

*Comparative Example

These examples demonstrate that only by using a novolac resin in the required amount yields a composition capable of achieving a combination of a tensile strength greater than or equal to 70 MPa, an impact strength of greater than or equal to 35 J/m, Heat deflection temperature greater than or equal to 165° C. and an elongation at break greater than or equal to 100% in polyethersulfone rich compositions.

Addition of epoxy shows good improvement in the tensile and impact strength compare to the control blends in some PPS rich and Polyethersulfone rich compositions. Two different types of multifunctional epoxies have been evaluated as a compatibilizer in Polyethersulfone-PPS system. The amount of epoxy in the composition varied from 0.5 to 1.5 wt % and 1% was found to optimum level to show enhancement in the properties like Tensile and impact properties. Novalac resin shows improvement in properties in both polyethersulfone rich compositions and PPS rich compositions. Also the blends shows better flow performance compare to Polyethersulfone resin.

Although the present invention has been described in considerable detail with reference to certain preferred versions thereof, other versions are possible. Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C §112, sixth paragraph. In particular, the use of "step of" in the claims herein is not intended to invoke the provisions of 35 U.S.C §112, sixth paragraph.

What is claimed is:

1. A composition comprising a blend of:
    a) 30-90 wt. % of a polyethersulfone;
    b) 10-90 wt. % of a polyphenylene sulfide (PPS); and,
    c) 0.1-25 wt. % of an epoxy; and,
    d) 0.5-50 wt. % of a polyetherimide;
    wherein the polyetherimide and epoxy together are present in an amount effective to act as a compatibilizer for the polyethersulfone and polyphenylene sulfide (PPS);
with the proviso that the total weight percent of the components a), b), c) and d) does not exceed 100 wt. %; wherein the composition possesses a tensile strength greater than 75 MPa, an impact strength of at least 65 J/m, and an elongation at break of at least 116%.

2. The composition of claim 1, wherein the epoxy is an epoxy cresol novolac resin.

3. The composition of claim 1, wherein the polyphenylene sulfide (PPS) is a linear poly(phenylene) sulfide.

4. The composition of claim 1, wherein the morphology of the composition is dispersed domains of polyethersulfone and polyphenylene sulfide (PPS).

5. The composition of claim 1, wherein the polyetherimide is present in the range of 0.5-30 wt %, and the epoxy is in the range of 0.5-1.5 wt %.

6. An extrudate comprising the composition of claim 1.

7. A molded product comprising the composition of claim 1.

8. An injection molded product comprising the composition of claim 1.

9. The composition of claim 1, wherein the polyphenylene sulfide (PPS) is present in the range of 24.5-74.5 wt %.

10. The composition of claim 1, wherein the morphology of the composition is dispersed domains of polyphenylene sulfide (PPS) and polyethersulfone.

11. A composition comprising a blend of:
 a) 30-90 wt. % of a polyethersulfone;
 b) 10-90 wt. % of a polyphenylene sulfide (PPS); and,
 c) 0.1-25 wt. % of an epoxy; and,
 d) 0.5-50 wt. % of a polyetherimide;
 wherein the polyetherimide and epoxy together are present in an amount effective to act as a compatibilizer for the polyethersulfone and polyphenylene sulfide (PPS);
with the proviso that the total weight percent of the components a), b), c) and d) does not exceed 100 wt. %; wherein the composition exhibits a heat deflection temperature (HDT) of at least 165° C.

12. A composition comprising a blend of:
 a) 49.5-74.5 wt. % of a polyethersulfone;
 b) 10-90 wt. % of a polyphenylene sulfide (PPS); and,
 c) 0.1-25 wt. % of an epoxy; and,
 d) 0.5-50 wt. % of a polyetherimide;
 wherein the polyetherimide and epoxy together are present in an amount effective to act as a compatibilizer for the polyethersulfone and polyphenylene sulfide (PPS);
with the proviso that the total weight percent of the components a), b), c) and d) does not exceed 100 wt. %.

\* \* \* \* \*